(12) United States Patent
Anno et al.

(10) Patent No.: US 6,417,918 B1
(45) Date of Patent: Jul. 9, 2002

(54) TIRE INSPECTING METHOD AND APPARATUS

(75) Inventors: Tsuyoshi Anno; Hiroki Kunitake; Takahiro Gotou; Masamichi Kihara, all of Tokyo (JP)

(73) Assignee: Bridgestone Corporation, Tokyo (JP)

( * ) Notice: Subject to any disclaimer, the term of this patent is extended or adjusted under 35 U.S.C. 154(b) by 4 days.

(21) Appl. No.: 09/666,833

(22) Filed: Sep. 21, 2000

(30) Foreign Application Priority Data

Sep. 22, 1999  (JP) .......................................... 11-268698

(51) Int. Cl.⁷ .......................... G01N 21/00; G01M 1/08
(52) U.S. Cl. ......................... 356/237.1; 73/146; 73/462
(58) Field of Search ............................. 356/237.1, 394, 356/601, 426, 602, 398, 3.08; 73/146, 460, 462; 33/551; 702/167, 157, 158

(56) References Cited

U.S. PATENT DOCUMENTS

| | | | | |
|---|---|---|---|---|
| 3,918,816 A | * | 11/1975 | Foster et al. ................... | 73/146 |
| 4,392,745 A | * | 7/1983 | Wright et al. ................. | 356/348 |
| 4,798,469 A | * | 1/1989 | Burke ........................ | 356/376 |
| 5,092,166 A | * | 3/1992 | Wada et al. ................... | 73/146 |
| 5,485,406 A | * | 1/1996 | Wada et al. ................... | 73/146 |
| 5,703,680 A | * | 12/1997 | Dunn et al. .................. | 356/354 |
| 6,124,925 A | * | 9/2000 | Kaneko et al. ........... | 356/237.1 |
| 6,285,195 B1 | * | 9/2001 | Takahashi ................... | 29/407.1 |

FOREIGN PATENT DOCUMENTS

JP    6-18233    * 1/1994

* cited by examiner

*Primary Examiner*—Hoa Q. Pham
(74) *Attorney, Agent, or Firm*—Sughrue Mion, PLLC

(57) ABSTRACT

The present invention is a tire inspecting apparatus comprising: a rotating unit, which rotates a tire having a specific point and a mark indicating a reference point; a sensor, which detects that the mark has been positioned in a predetermined direction with respect to a center of the tire; a detecting unit, which detects a position of the specific point; and a controller, which drives the rotating unit; stops the rotation of the tire when the mark has been positioned in the predetermined direction with respect to the center of the tire; causes the detecting unit to detect the position of the specific point; and detects an angle in a clockwise direction, between a direction connecting the detected position of the specific point and the center of the tire, and the predetermined direction.

17 Claims, 8 Drawing Sheets

TIRE INSPECTING METHOD AND APPARATUS

BACKGROUND OF THE INVENTION

1. Field of the Invention

The present invention relates to a method and apparatus for detecting an angle between a direction connecting a center of a tire and a specific point of the tire such as a balance light-point, and a direction connecting the center of the tire and a reference point of the tire.

2. Description of the Related Art

A tire has a specific point such as a balance light-point (a lightest point of the tire) for manufacturing reasons. For example, the balance light-point results from a joint of a carcass, a belt or the like. When the tire is mounted onto a wheel, the balance light-point is aligned to a heaviest portion of the wheel.

A conventional balance inspecting apparatus for detecting a balance light-point detects a balance light-point of a tire in accordance with a reference of the apparatus itself, and puts a mark or the like at the balance light-point.

The tire is provided with a reference point thereof such as a bar code. If the number of degrees of the angle which is most frequently formed in a clockwise direction, between a direction connecting a center of the tire and the balance light-point or the like, and a direction connecting the center of the tire and the reference point of the tire, can be determined, this information can be immediately used to improve the tire.

However, conventionally, the angle has been measured by human labor, and thus, much time and labor has been required to measure the angle even for one tire. Therefore, it has been substantially impossible to check the angles for all of the tires, so it has been necessary to carry out sampling inspection.

Accordingly, much time has been required to collect the amount of information required to improve the tires and to analyze the collected information, and thus, it has not been possible to use the information immediately to improve the tires.

SUMMARY OF THE INVENTION

In view of above point, an object of the present invention is to provide: a method for measuring an angle in a clockwise direction, between a direction connecting a center of a tire and a specific point of the tire, and a direction connecting the center of the tire and a reference point of the tire (hereinafter, the angle will be suitably referred to as a rotation direction angle); and an apparatus which can carry out this method without requiring much time and labor.

In order to attain the above object, the present invention provides a tire inspecting method comprising steps of: detecting a mark indicating a reference point of a tire; and detecting automatically a position of a specific point of the tire which forms a rotation direction angle with respect to the reference point detected in the mark detecting step.

A mark indicating a reference point of a tire is detected in the mark detecting step, and on the basis of the detected information, a position of a specific point is detected as a rotation direction angle with respect to the reference point in the specific point position detecting step. In other words, an angle in a clockwise direction, between a direction connecting the specific point and a center of the tire, and a direction connecting the mark and the center of the tire, is automatically detected. Accordingly, the angles for all of the tires can be inspected without requiring much time and labor, and the obtained angles can be immediately used to improve the tires.

Further, the present invention provides a tire inspecting apparatus comprising: a rotating means, which rotates a tire having a specific point and a mark indicating a reference point; a sensor, which detects that the mark has been positioned in a predetermined direction with respect to a center of the tire; a detecting means, which detects a position of the specific point; and a controller, which drives the rotating means; stops the rotation of the tire when the mark has been positioned in the predetermined direction with respect to the center of the tire; causes the detecting means to detect the position of the specific point; and detects an angle in a clockwise direction, between a direction connecting the detected position of the specific point and the center of the tire, and the predetermined direction.

In the tire inspecting apparatus, due to control by the controller, the rotating means rotates a tire, and when the sensor has detected that a mark had been positioned in a predetermined direction with respect to a center of the tire, the driving of the rotating means is stopped such that the rotation of the tire is stopped. Then, the detecting means detects a position of a specific point; and the controller detects an angle in a clockwise direction, between a direction connecting the detected position of the specific point and the center of the tire, and the predetermined direction.

In this way, an angle in a clockwise direction, between a direction connecting the position of the specific point and the center of the tire, and a direction connecting the mark and the center of the tire, can be automatically detected. Accordingly, time and labor required for a measurement is reduced, and the obtained angles can be immediately used to improve the tires.

Furthermore, the present invention provides a tire inspecting apparatus, which detects an angle in a clockwise direction, between a direction connecting a center of the tire, which has a specific point and a mark indicating a reference point, and the specific point, and a direction connecting the center of the tire and the mark, the apparatus comprising: an image taking means, which takes an image of a surface of the tire at which the mark is provided; a detecting means, which detects a position of the specific point; and a controller, which detects a position of the mark by analyzing image information from the image taking means; calculates a first angle in the clockwise direction, between the direction connecting the mark and the center of the tire, and a predetermined direction; causes the detecting means to detect the position of the specific point; calculates a second angle in the clockwise direction, between the direction connecting the detected position of the specific point and the center of the tire, and the predetermined direction; and calculates an angle in the clockwise direction, between the direction connecting the mark and the center of the tire, and the direction connecting the specific point and the center of the tire, by subtracting the first angle from the second angle.

In the tire inspecting apparatus, due to control by the controller, the image taking means takes an image of a surface of a tire at which a mark is provided, and the detecting means detects a position of a specific point. The controller detects a position of the mark based on the information; calculates a first angle in a clockwise direction, between a direction connecting the mark and the center of the tire, and a predetermined direction; calculates a second angle in the clockwise direction, between a direction connecting the detected position of the specific point and the center of the tire, and the predetermined direction; and calculates an angle in the clockwise direction, between the direction connecting the mark and the center of the tire, and the direction connecting the specific point and the center of the tire, by subtracting the first angle from the second angle.

In this way, an angle in a clockwise direction, between a direction connecting the position of the specific point and the center of the tire, and a direction connecting the mark and the center of the tire, can be automatically detected. Accordingly, time and labor required for a measurement is reduced, and the obtained angles can be immediately used to improve the tires.

DESCRIPTION OF THE PREFERRED EMBODIMENTS

Hereinafter, a first embodiment of the present invention will be described based on FIGS. 1–5.

Figure 1:
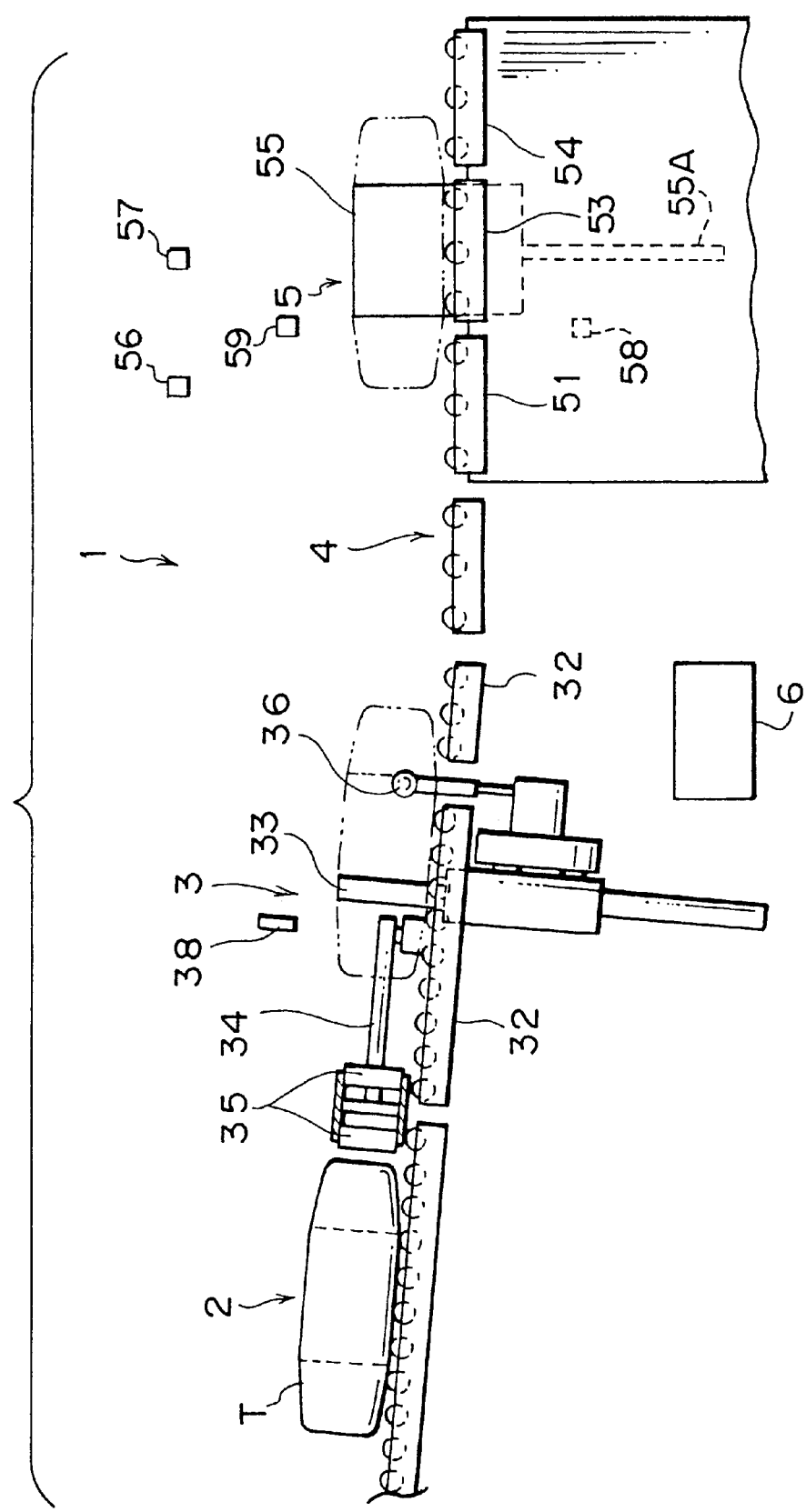
FIG. 1 is a side view showing a schematic structure of a balance light-point position detecting apparatus according to an embodiment of the present invention.
Figure 2:
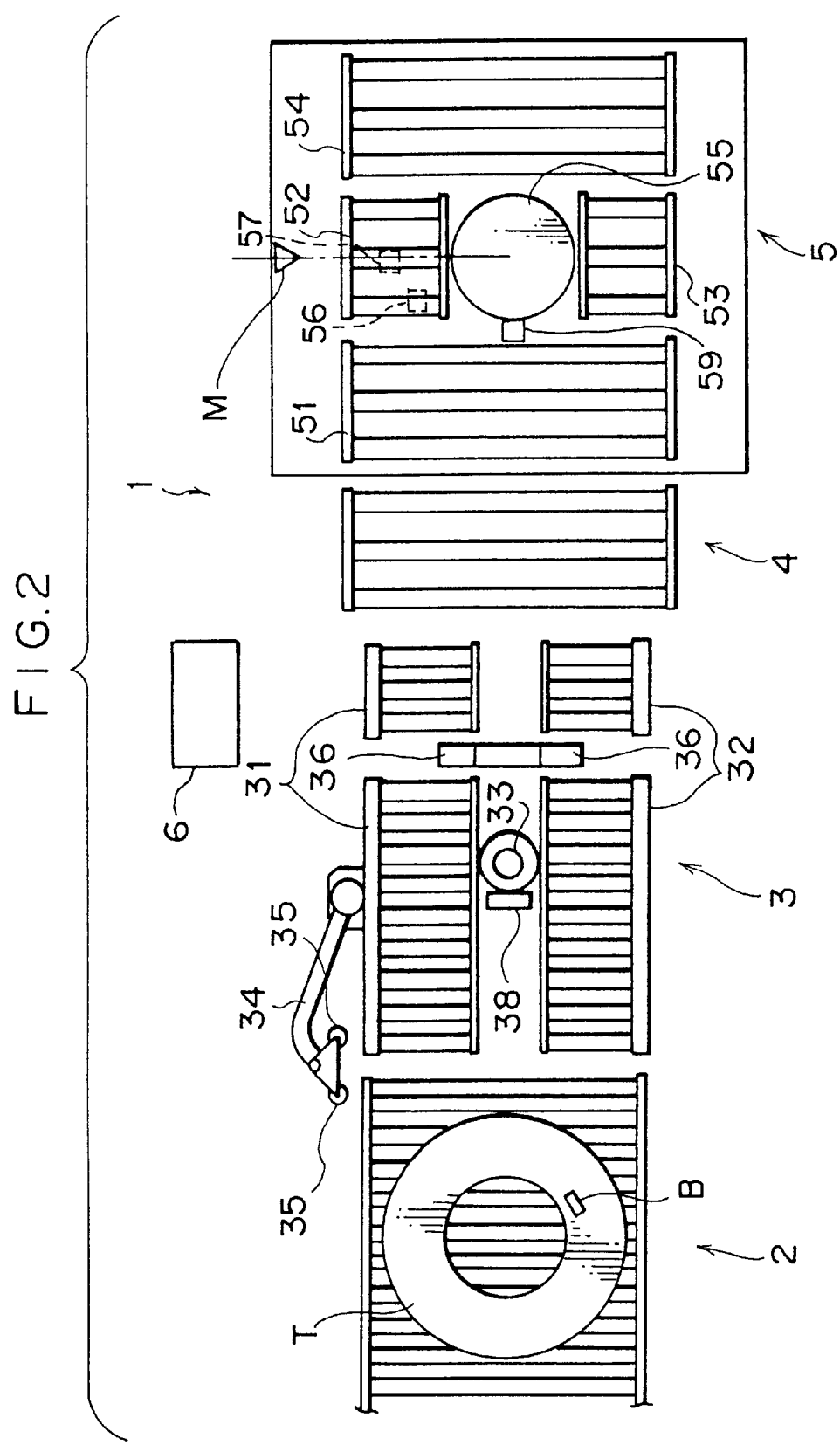
FIG. 2 is a plan view of the apparatus in FIG. 1.

In a tire inspecting apparatus 1 according to the present embodiment, the present invention is applied to a balance inspecting apparatus for detecting a position of a balance light-point. As shown in FIGS. 1 and 2, the tire inspecting apparatus 1 is provided with a carrying-in conveyer 2, a rotating roller portion 3, a carrying conveyer portion 4, a balance light-point position detecting unit 5 and a controller 6, sequentially from an upstream side of a conveying direction.

The carrying-in conveyer 2 is a roller conveyer which is provided with a plurality of rollers, whose longitudinal directions are parallel to a direction which is orthogonal to the conveying direction. The carrying-in conveyer 2 is inclined with respect to a horizontal direction so that a downstream side portion thereof in the conveying direction is lower than an upstream side portion thereof in the conveying direction.

The rotating roller portion 3 is provided with roller conveyers 31 and 32 which are arranged in parallel so as to be spaced apart from each other. The roller conveyers 31 and 32 are inclined with respect to a horizontal direction so that downstream side portions thereof in the conveying direction are lower than upstream side portions thereof in the conveying direction. A rotating roller 33 which can move upwardly and downwardly is provided between the roller conveyers 31 and 32.

A swinging arm 34, to a top end of which a pair of nipping rollers 35 are pivotally supported, is provided at an outer side of the roller conveyer 31. The swinging arm 34 can move from a position where the pair of nipping rollers 35 are disposed at the outer side of the roller conveyer 31 to a position where the pair of nipping rollers 35 are disposed in a conveying path of a tire T.

At a predetermined position at a downstream side from the rotating roller 33 in the conveying direction, a pair of stoppers 36 which can move upward and downward through a gap between rollers of the roller conveyers 31 and 32 are disposed in a direction which is orthogonal to the conveying direction.

Further, a bar code reader 38 is suspended above an upstream side from the rotating roller 33 in the conveying direction.

The carrying conveyer 4 which is continuous with the roller conveyers 31 and 32 is a roller conveyer in which rollers are horizontally arranged, and conveys the tire T to the balance light-point position detecting unit 5.

The balance light-point position detecting unit 5 is provided with a roller conveyer 51 which is disposed at an upstream side in the conveying direction, roller conveyers 52 and 53 which are disposed at a more downstream side in the conveying direction than the roller conveyer 51 and disposed in parallel and so as to be spaced apart from each other, a roller conveyer 54 which is disposed at a more downstream side in the conveying direction than the roller conveyers 52 and 53, a rim 55 for measuring a balance which is disposed between the roller conveyers 52 and 53 so as to move upwardly and downwardly, a distance detecting sensor 56 which can move around the rim 55 and detects an inclination of the rim 55, a marker 57 which can move around the rim 55 and can also move upwardly and downwardly, a light source 58 which is disposed at a more upstream side in the conveying direction than the rim 55 and emits light upwardly, and a photo sensor 59 which is disposed right above the light source 58.

The rim 55 is in a cylindrical shape, and an external diameter thereof is substantially the same as an internal diameter of the tire T, so that the tire T does not lower even if the rim 55 is moved upwardly when the rim 55 has been fitted into the tire T. Further, the rim 55 has two extended portions (not shown in the drawings), each of which extends from a point at an inner surface of an upper end portion of the rim 55 to a point which is opposite to said point, and passes through a center of the rim 55, and which portions are orthogonal to each other; and the rim 55 is supported on a supporting axis 55A, which is vertically disposed and can move upwardly and downwardly, at an intersecting portion of the two extended portions disposed at the center of the rim 55. Accordingly, the rim 55 can incline in any direction within 360 degrees.

The marker 57 is disposed at the roller conveyer 52 side in a reference direction indicated by M.

The reference direction passes through the center of the rim 55, and is orthogonal to the conveying direction of the tire.

The controller 6 includes a CPU and a memory, and is electrically connected to each driving device for all of the above-described conveyers (not shown in the drawings), a driving device for the swinging arm 34 (not shown in the drawings), the bar code reader 38, a driving device for the rotating roller 33 (not shown in the drawings), a driving device for the stoppers 36 (not shown in the drawings), a driving device for the supporting axis 55A (not shown in the drawings), a driving device for the distance detecting sensor 56 (not shown in the drawings), the distance detecting sensor 56, a driving device for the marker 57 (not shown in the drawings), the light source 58, and the photo sensor 59.

Further, a bar code B is affixed to a side surface of the tire T near a bead thereof. In the present embodiment, the bar code B is used as a mark indicating a reference point of the tire.

An operating procedure in the tire inspecting apparatus 1 having the above structure will be described below in accordance with FIGS. 2–6.

The tire T is carried in by the carrying-in conveyer 2 (see FIG. 2), and transferred onto the roller conveyers 31 and 32 at the rotating roller portion 3.

At this time at the rotating roller portion 3, the rotating roller 33 is retracted downwards, the stoppers 36 are protruded upwards, the nipping rollers 35 are withdrawn outwards due to a swinging of the swinging arm 34, and the rollers of the roller conveyers 31 and 32 are rotated in the same direction.

Figure 3:
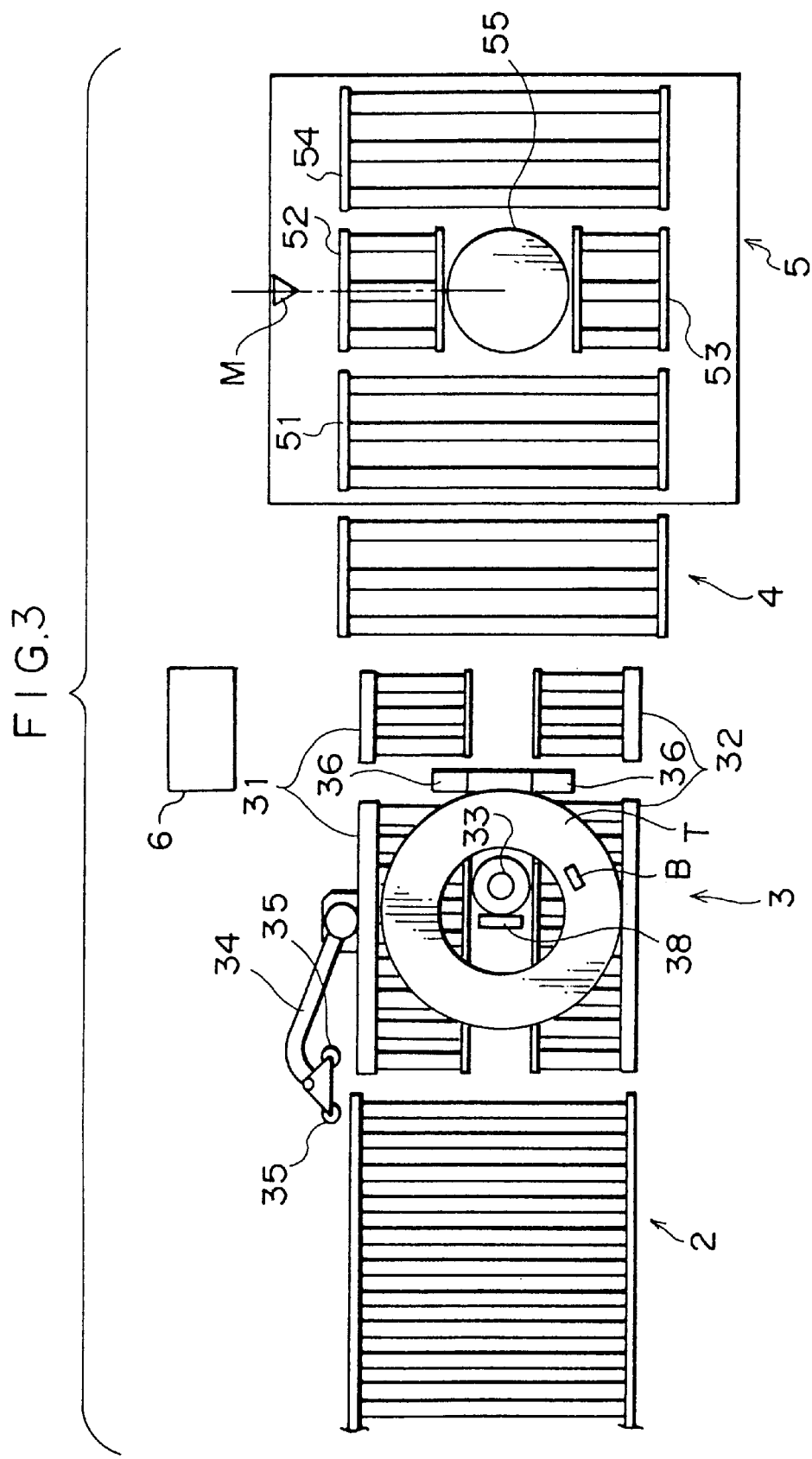
FIG. 3 is a plan view showing a state in which a tire has been conveyed to a rotating roller portion.

Accordingly, the tire T which has been carried in by the roller conveyers 31 and 32 is stopped by the stoppers 36 (see FIG. 3).

Figure 4:
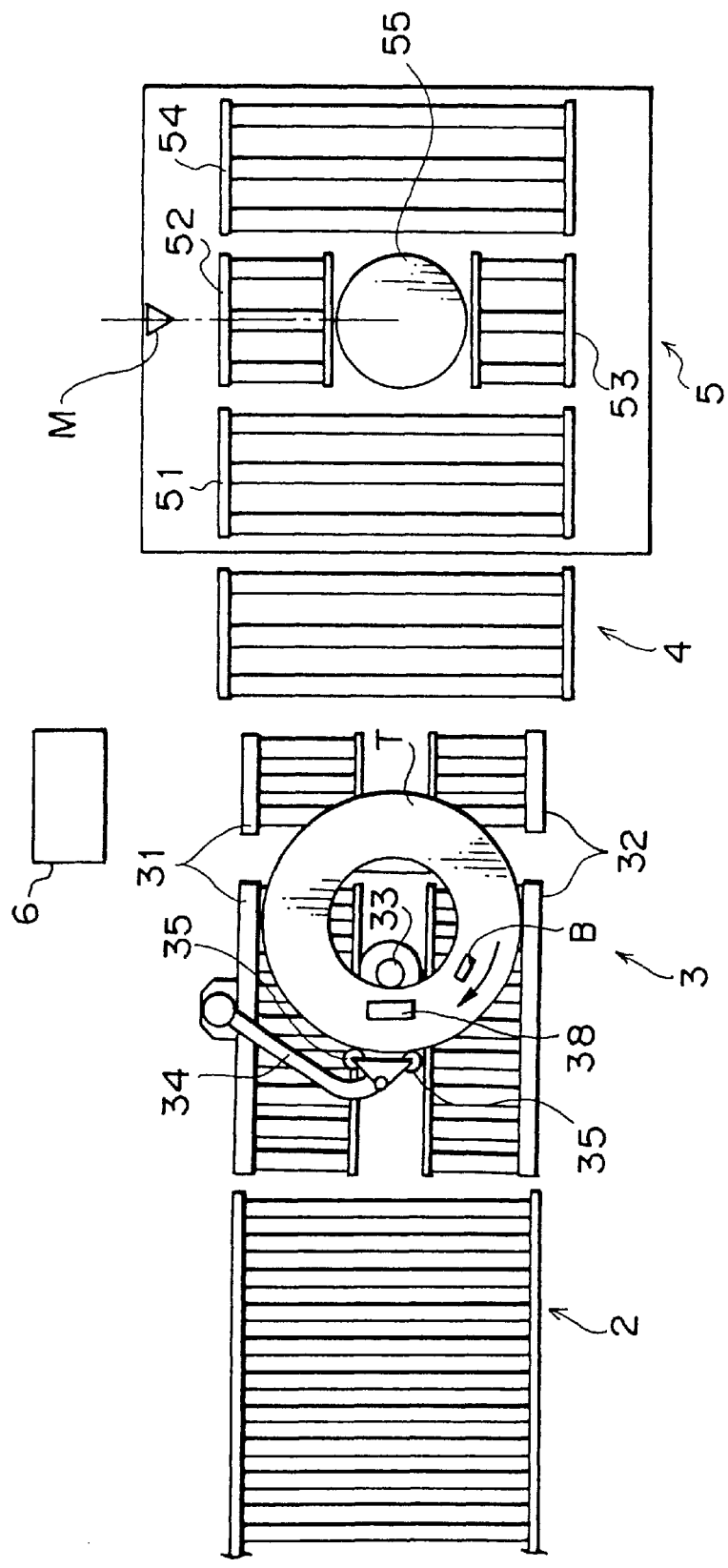
FIG. 4 is a plan view showing a state in which the tire is rotated at the rotating roller portion.
Figure 5:
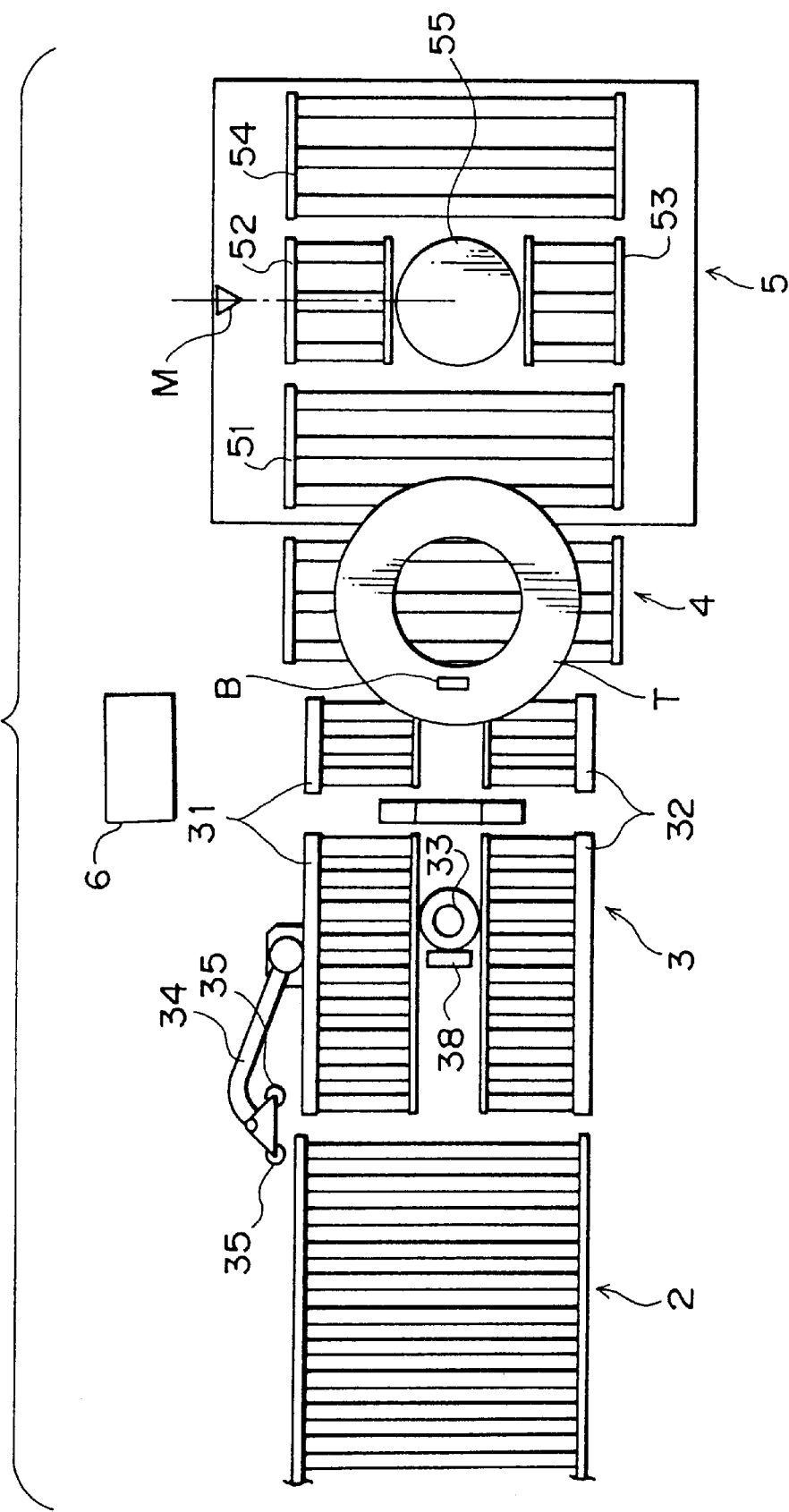
FIG. 5 is a plan view showing a state in which the tire is conveyed at a carrying conveyer portion.
Figure 6:
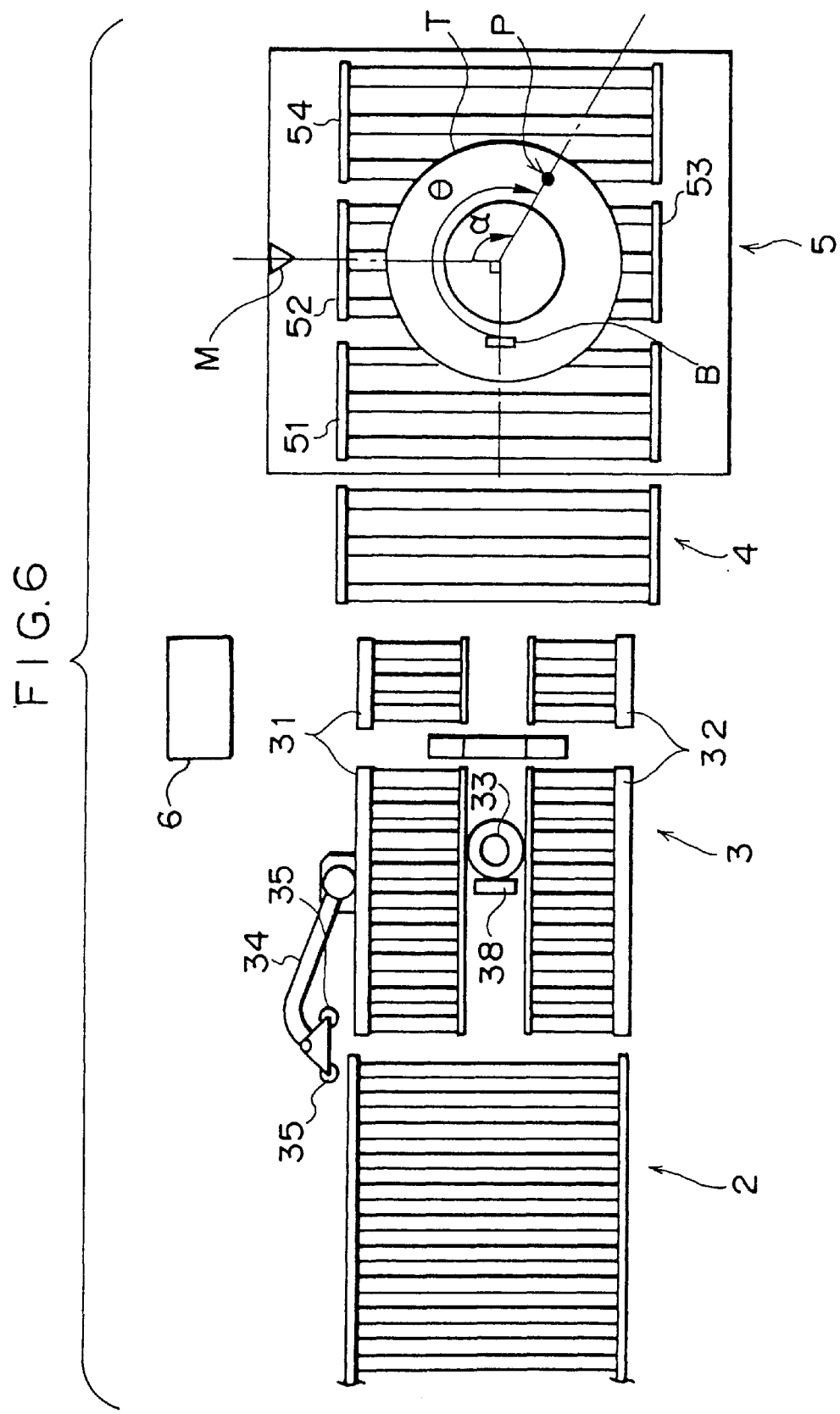
FIG. 6 is a plan view showing a state in which the tire has been mounted onto a balance light-point position detecting unit.

Then, the rotating roller 33 is protruded upwards such that the rotating roller 33 is inserted into a hollow portion of the stopped tire T, the stoppers 36 are retracted such that the tire T is slightly moved until an internal edge of the tire T abuts the rotating roller 33, and the swinging arm 34 is swung and the nipping rollers 35 at a top end of the swinging arm 34 are thereby pivoted such that the tire T is nipped between the nipping rollers 35 and the rotating roller 33 (see FIG. 4).

In this state, the roller conveyers 31 and 32 are driven in the opposite directions of each other. As a result, the tire T which has been disposed so as to be over the both roller conveyers 31 and 32 is rotated at a predetermined position, as shown in FIG. 4.

The bar code reader 38 is suspended at a predetermined position above the vicinity of the bead of the rotating tire T, and can read the bar code B affixed to the tire T.

The driving of roller conveyers 31 and 32 is stopped at the time when the bar code reader 38 has read the bar code B, and the rotation of the tire T is thereby stopped.

At this time, the bar code B is positioned at a more upstream side in the conveying direction than the center of the tire T. Next, when the rotating roller 33 is retracted, and the roller conveyers 31 and 32 are driven in the same direction, the tire T is sent onto the carrying conveyer 4, and then, while the bar code B is kept positioned at the more upstream side in the conveying direction than the center of the tire T, the tire T is conveyed onto the balance lightpoint position detecting unit 5 by the carrying conveyer 4 (see FIG. 5).

At this time at the balance light-point position detecting unit 5, the rim 55 is at a position which is as high as or lower than the roller conveyers 51, 52 and 53. The tire T is conveyed along the conveying direction by the roller conveyers 51, 52 and 53. The controller 6 stops the roller conveyers 51, 52 and 53 at a predetermined time after receiving detected signals (front end detected signals or back end detected signals) from the photo sensor 59. At this time, the center of the tire T is coincident with the center of the rim 55, and the rim 55 is moved upwardly so as to fit into the hollow portion of the tire T (see FIG. 6).

When the tire T has been mounted onto the balance light-point position detecting unit 5 in this way, there is an angle of 90 degrees formed between the direction which passes through the center of the tire T and the center in the transverse direction of the bar code B on the tire T, and the reference direction M at the balance light-point position detecting unit 5.

Next, the rim 55 is moved further upwards, the vicinity of the bead at a lower surface of the tire T becomes separated from the roller conveyers 51–54, and the tire T inclines in accordance with its weight balance. At this time, a balance light-point is at a highest position. The controller 6 moves the distance detecting sensor 56 along the periphery of the rim 55, and stops the distance detecting sensor 56 at a plurality of predetermined positions on the moving track. The distance detecting sensor 56 uses magnetism or light at the time of stopping, and measures a distance between the distance detecting sensor 56 and an upper surface of the tire T by, for example, measuring a time from the time when light is emitted, to the time when the light is reflected by the tire T and returned to the distance detecting sensor 56. The measured values are sent to the controller 6, and the controller 6 determines a position of the balance light-point P from the measured values and the corresponding positions where the distance detecting sensor 56 was stopped. Then, the controller 6 calculates an angle α in the clockwise direction, between the direction connecting the balance light-point P and the center of the tire T, and the reference direction M. Next, the rim 55 is moved downwardly to a position where the lower surface of the tire T touches the roller conveyers 51–54, and the marker 57 disposed in the reference direction M is moved around the rim 55 by the amount of the angle α. Then, the marker 57 is moved downwardly so as to mark P showing a balance light-point on the tire T, and thereafter, the marker 57 is returned to the first position. After that, the rim 55 is brought to a position which is as high as or lower than the roller conveyers 51, 52 and 53.

The controller 6 adds 90 degrees to the calculated angle α, and sends the obtained value, i.e., an angle θ in the clockwise direction, between the direction connecting the bar code B of the tire and the center of the tire, and the direction connecting the balance light-point and the center of the tire, to an unillustrated host computer or the like.

In this manner, the position of the balance light-point P of the tire T can be detected as a rotation direction angle θ with respect to the bar code B showing a reference point of the tire T.

The tire T is carried out by the roller conveyers 52, 53 and 54, and a new tire T is carried in the rotating roller portion 3.

As all of the above-described respective processes are automatically carried out, they do not cause the operators any trouble, and time and labor is considerably reduced.

Further, positions of balance light-points P of all of the tires T can be detected, the amount of detected information which is required to improve the tires T can be obtained in a short time, and the obtained information can be immediately used to improve the tires.

The tire inspecting apparatus 1 in the above embodiment detects the angle α by the balance light-point position detecting unit 5 and the controller 6. However, it is also possible that a conventionally known balance device, which detects the angle α and marks the detected position, is used as the balance light-point position detecting unit 5, and the controller 6 adds the angle in the clockwise direction, between the direction connecting the center of the tire and the reference point of the tire, and the reference direction, to the angle α detected by the balance device.

Further, it is also possible that the rim 55 is enabled to rotate and the bar code reader is provided above the rim so as to omit the carrying-in conveyer 2, the rotating roller portion 3 and the carrying conveyer portion 4. In this case, it is also possible for the tire to be mounted onto the rim 55, and the rim 55 rotated thereafter until the bar code reader has read the bar code, and then the position of the balance light-point P and the angle θ are obtained as described above.

The above embodiment may be provided with a tire-uniformity measuring device in place of the balance light-point position detecting unit 5. In this case, the tire is conveyed to the device in the state in which the bar code is positioned at a more upstream side in the conveying direction than the center of the tire, thereafter the tire is mounted onto the rotatable rim in the vertical direction of the tire-uniformity measuring device so that the bar code is disposed at a predetermined position, and then the tire is caused to make one revolution. As a result, a primary peak (maximum value) of Radial Force Variation (RFV) generated when the tire is rotated is detected by the measuring device, and the position showing the primary peak is measured by an encoder or the like, which is attached to the rim and whose reference is set at the predetermined position. From the results of the encoder, an angle between the direction connecting the bar code B and the center of the tire, and the direction connecting the RFV specific point and the center of the tire, is calculated. Also in this case of the tire-uniformity measuring device, the bar code reader may be provided near the rim so as to omit the carrying-in conveyer 2, the rotating roller portion 3 and the carrying conveyer portion 4. In this case, the tire is mounted onto the rim, and the tire is rotated until the bar code has been disposed at the predetermined position corresponding to the bar code reader, and thereafter, the tire is caused to make one more revolution. As a result, a maximum value of RFV and a position corresponding to the maximum value can be measured by the encoder or the like in which a reference is set at the predetermined position. The tire-uniformity measuring device can also measure an angle in the clockwise direction, between the direction connecting the bar code B and the center of the tire, and the direction connecting the maximum value of the radial variation, which value is one of the specific points of the tire, and the center of the tire.

The present invention can be applied to other detecting devices for detecting specific point positions of tires.

Figure 7:
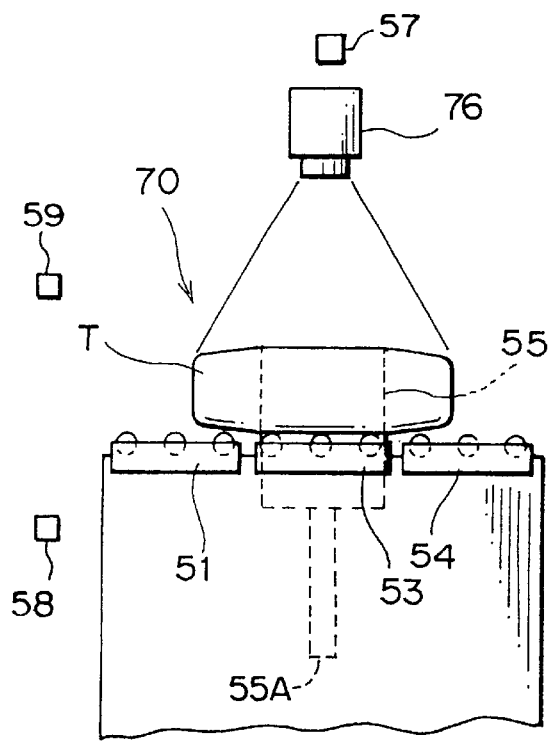
FIG. 7 is a side view showing a schematic structure of a balance light-point position detecting apparatus according to another embodiment.
Figure 8:
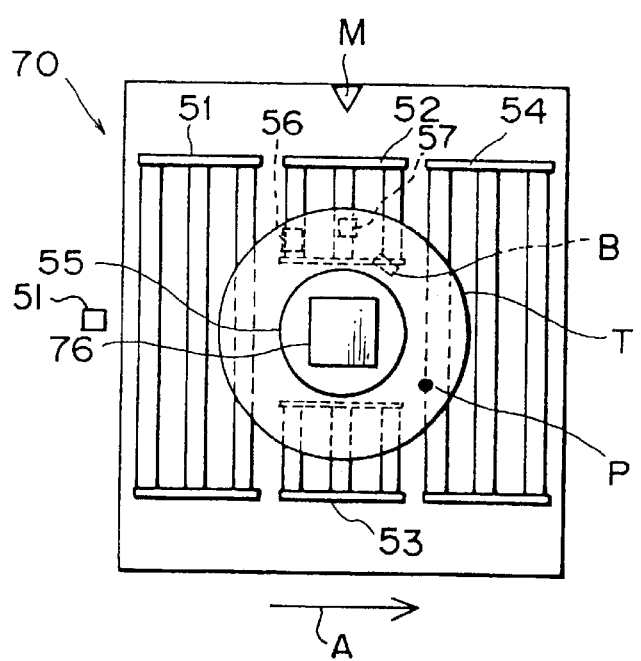
FIG. 8 is a plan view of the apparatus in FIG. 7.

Next, another embodiment, a balance light-point position detecting device 70 will be described based on FIGS. 7–9. The same reference numerals are applied to the same structures as the balance light-point position detecting unit 5 in order to omit descriptions. The balance light-point position detecting device 70 is provided with a CCD camera 76 which is disposed at a predetermined position above the rim 55. The CCD camera 76 converts an optical image to electric signals which have a voltage corresponding to a quantity of light of the optical image, and converts the electric signals to image data with an A/D (analog/digital) converter.

In the balance light-point position detecting device 70, the light source 58 and the photo sensor 59 are disposed at a more upstream side in the conveying direction (direction A) than the roller conveyer 51, and the distance detecting sensor 56 is disposed above the CCD camera 76 and enabled to move upward, downward and around the rim 55. The marker 57 is also disposed above the CCD camera 76.

The controller 6 is electrically connected to each driving device for all of the conveyers (not illustrated), a driving device for the supporting axis 55A (not illustrated), a driving device for the distance detecting sensor 56 (not illustrated), the distance detecting sensor 56, a driving device for the marker 57 (not illustrated), the light source 58, and the photo sensor 59.

At the balance light-point position detecting device 70, the rim 55 is initially at a position which is as high as or lower than the roller conveyers 51, 52 and 53. The tire T, which has been conveyed to the balance light-point position detecting device 70 by an unillustrated conveying means, is conveyed along the conveying direction by the roller conveyers 51, 52 and 53. The controller 6 stops the roller conveyers 51, 52 and 53 at a predetermined time after receiving detected signals (front end detected signals or back end detected signals) from the photo sensor 59. At this time, the center of the tire T is coincident with the center of the rim 55, and the rim 55 is moved upwardly so as to fit into the hollow portion of the tire T.

The controller 6 receives the image data from the CCD camera 76 when the tire T is horizontally disposed at a position for assembling the tire T with the rim 55 (at this time, the rim 55 may or may not be fitted to the tire T) and before the balance light-point P is marked. The controller 6 compares the image data, and thereby detects the position of the portion, at which the bar code B is affixed, whose image density is different from that of other portions, and calculates an angle β in the clockwise direction, between the direction connecting the position and the center of the tire, and the reference direction M.

A rotation direction angle α is calculated in the same manner as the above-described procedure, and the calculated position is marked.

Figure 9:
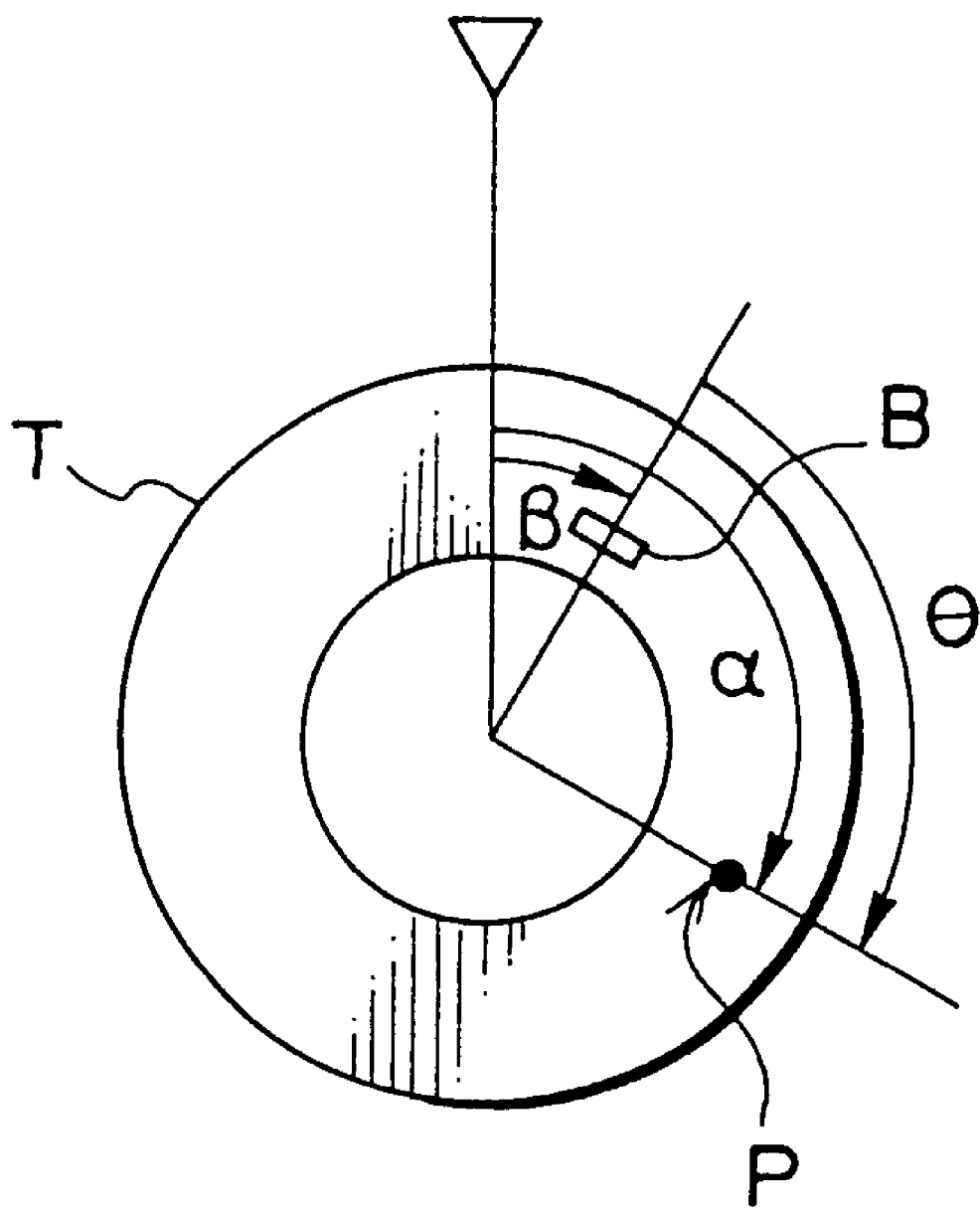
FIG. 9 is a view for explaining a method for calculating a balance light-point position.

Next, as shown in FIG. 9, the controller 6 subtracts the angle β from the angle α, and thereby calculates an angle θ in the clockwise direction, between the direction connecting the bar code B of the tire and the center of the tire, and the direction connecting the balance light-point and the center of the tire.

In this way, the angle θ in the clockwise direction, between the direction connecting the bar code B of the tire and the center of the tire, and the direction connecting the balance light-point and the center of the tire, can be sequentially and automatically detected for the carried-in tires T without causing the operators any trouble, and thus, time and labor is considerably reduced.

Further, as one measurement can be achieved in a short time, the angles θ for all of the tires T can be measured, an amount of information which is required to improve the tires T can be obtained in a short time, and the information can be immediately used to improve the tires.

Although the CCD camera 76 is disposed above the rim 55 in the embodiment, the CCD camera 76 may be disposed at a more upstream side in the conveying direction than the roller conveyer 51. In this case, the light source 58, the photo sensor 59, the distance detecting sensor 56 and the marker 57 may be disposed at the same positions as in the first embodiment.

The present embodiment can be also applied to the tire-uniformity measuring device. In this case, the tire is mounted onto the rim, and thereafter, an image of a surface of the tire at which the bar code is affixed is taken by the CCD camera, and before or after the image is taken, the tire is caused to make one revolution. As a result, a maximum value of RFV is measured by the measuring device, and a position corresponding to the maximum value can be measured by the encoder or the like.

When the bar code B is affixed to a particular position of the tire T, for example, a position which always has a fixed positional relationship with a side-joint portion, if there is a statistical bias on positions of balance light-points P or primary peak positions of RFV, the cause is traced on the basis of the relationship with the side-joint portion, and the obtained information can be used to improve the tires.

Although the bar code B affixed to the tire T is detected as a mark indicating the reference point by the bar code reader or the CCD camera in the above embodiment, any optically detectable marks other than the bar code B may indicate the reference point of the tire.

What is claimed is:

1. A tire inspecting method comprising steps of:
    detecting a mark indicating a reference point of a tire; and
    detecting automatically a position of a specific point of the tire which forms a rotation direction angle with respect to the reference point detected in said mark detecting step.

2. A tire inspecting method according to claim 1, further comprising the steps of:
    positioning said mark in a predetermined direction from a center of the tire by rotating the tire having said mark and said specific point;
    detecting a position of said specific point; and
    detecting an angle in a clockwise direction, between a direction connecting the detected position of said specific point and the center of the tire, and said predetermined direction.

3. A tire inspecting method according to claim 1, further comprising the steps of:
    taking an image of a surface of the tire at which said mark is provided;
    detecting a position of said mark by analyzing image information of the tire whose image has been taken;
    calculating a first angle in the clockwise direction, between a direction connecting the position of said mark and the center of the tire, and a predetermined direction;
    detecting a position of said specific point;
    calculating a second angle in the clockwise direction, between a direction connecting the position of said specific point and the center of the tire, and said predetermined direction; and
    calculating an angle in the clockwise direction, between the direction connecting said mark and the center of the tire, and the direction connecting said specific point and the center of the tire, by subtracting said first angle from said second angle.

4. A tire inspecting apparatus comprising:
    a rotating means, which rotates a tire having a specific point and a mark indicating a reference point;
    a sensor, which detects that said mark has been positioned in a predetermined direction with respect to a center of the tire;
    a detecting means, which detects a position of said specific point; and
    a controller, which drives said rotating means; stops the rotation of the tire when said mark has been positioned in said predetermined direction with respect to the center of the tire; causes said detecting means to detect the position of said specific point; and detects an angle in a clockwise direction, between a direction connecting the detected position of said specific point and the center of the tire, and said predetermined direction.

5. A tire inspecting apparatus according to claim 4, wherein said rotating means rotates the tire in a horizontal direction, and further comprises: a conveying means, which conveys the tire, in which said mark has been positioned in the predetermined direction with respect to the center of the tire, to said detecting means along a conveying direction, while said mark is kept positioned in the predetermined direction with respect to the center of the tire.

6. A tire inspecting apparatus according to claim 5, wherein said conveying means comprises: roller conveyers, and a sensor which detects when the tire has passed a predetermined position in said conveying direction.

7. A tire inspecting apparatus according to claim 6, wherein said sensor, which detects when the tire has passed the predetermined position in said conveying direction, comprises: a light source, which emits light toward said predetermined position; and a photo sensor, which detects the light from said light source.

8. A tire inspecting apparatus according to claim 5, wherein said rotating means comprises: a pair of roller conveyers, which are disposed in parallel and driven independently; and a holding means, which holds said tire at a predetermined position.

9. A tire inspecting apparatus according to claim 8, wherein said holding means comprises: stoppers which are disposed between said pair of roller conveyers so as to move upwardly and downwardly; and a swinging arm, which can move from a position where the swinging arm nips the tire with said stoppers, to an outer position in said conveying direction.

10. A tire inspecting apparatus according to claim 4, wherein said mark is a bar code, and said sensor is a bar code reader.

11. A tire inspecting apparatus according to claim 4, wherein said detecting means comprises: a rim, which can be inclined in any direction within 360 degrees; and a sensor, which detects an inclination of said rim.

12. A tire inspecting apparatus according to claim 11, wherein said sensor, which detects the inclination of said rim, can move around said rim, and measures a distance between said sensor and an upper surface of said tire or said rim.

13. A tire inspecting apparatus according to claim 4, wherein said detecting means comprises: a sensor, which measures a maximum value of Radial Force Variation generated when the tire is rotated; and an encoder, which is attached to said rotating means.

14. A tire inspecting apparatus, which detects an angle in a clockwise direction, between a direction connecting a center of the tire, which has a specific point and a mark indicating a reference point, and said specific point, and a direction connecting the center of the tire and said mark, said apparatus comprising:
    an image taking means, which takes an image of a surface of the tire at which said mark is provided;
    a detecting means, which detects a position of said specific point; and
    a controller, which detects a position of said mark by analyzing image information from said image taking means; calculates a first angle in the clockwise direction, between the direction connecting said mark and the center of the tire, and a predetermined direction; causes said detecting means to detect the position of said specific point; calculates a second angle in the clockwise direction, between the direction connecting the detected position of said specific point and the center of the tire, and said predetermined direction; and calculates an angle in the clockwise direction, between the direction connecting said mark and the center of the tire, and the direction connecting said specific point and the center of the tire, by subtracting said first angle from said second angle.

15. A tire inspecting apparatus according to claim 14, wherein said image taking means is a CCD camera.

16. A tire inspecting apparatus according to claim 14, wherein said detecting means comprises: a rim, which can be inclined in any direction within 360 degrees; and a sensor, which detects an inclination of said rim.

17. A tire inspecting apparatus according to claim 14, wherein said detecting means comprises: a rotating means, which rotates the tire; a sensor, which measures a maximum value of Radial Force Variation generated when the tire is rotated; and an encoder, which is attached to said rotating means.

\* \* \* \* \*